United States Patent

Kataoka et al.

[11] Patent Number: 5,939,851
[45] Date of Patent: Aug. 17, 1999

[54] POSITION CONTROL DEVICE

[75] Inventors: Kenichi Kataoka, Kawasaki; Shinji Yamamoto; Tadashi Hayashi, both of Yokohama, all of Japan

[73] Assignee: Canon Kabushiki Kaisha, Tokyo, Japan

[21] Appl. No.: 08/997,484

[22] Filed: Dec. 23, 1997

[30] Foreign Application Priority Data

Dec. 27, 1996 [JP] Japan .................................. 8-351527

[51] Int. Cl.$^6$ .................................................. G05B 5/01
[52] U.S. Cl. .......................... 318/611; 318/624; 318/114; 318/120; 318/447; 310/316
[58] Field of Search .................... 318/611, 623, 318/624, 280, 281, 283, 445, 447, 452, 466, 470, 114, 120, 127; 310/316, 317

[56] References Cited

U.S. PATENT DOCUMENTS

| | | | |
|---|---|---|---|
| 4,152,569 | 5/1979 | Bell, Jr. et al. ...................... | 219/69.16 |
| 4,325,014 | 4/1982 | Jeck ........................................ | 318/614 |
| 4,335,341 | 6/1982 | Ogasawara .............................. | 318/624 |
| 4,506,203 | 3/1985 | Redmond, Jr. .......................... | 318/624 |
| 4,510,411 | 4/1985 | Hakamata ................................ | 310/316 |
| 4,560,263 | 12/1985 | Katsuma et al. ........................ | 396/133 |
| 4,672,191 | 6/1987 | Cofield .................................. | 250/203.4 |
| 4,713,571 | 12/1987 | Suzuki et al. .......................... | 310/316 |
| 4,727,276 | 2/1988 | Izukawa et al. ........................ | 310/316 |
| 4,742,284 | 5/1988 | Dziubakowski et al. ............... | 318/624 |
| 4,833,358 | 5/1989 | Suzuki et al. .......................... | 310/316 |
| 4,914,337 | 4/1990 | Takagi .................................... | 310/316 |
| 4,952,834 | 8/1990 | Okada .................................... | 310/316 |
| 4,998,048 | 3/1991 | Furutsu .................................. | 318/116 |
| 5,001,404 | 3/1991 | Kataoka .................................. | 318/116 |
| 5,004,964 | 4/1991 | Kataoka et al. ........................ | 318/128 |
| 5,013,982 | 5/1991 | Sasaki .................................... | 310/316 |
| 5,023,526 | 6/1991 | Kuwabara .............................. | 318/116 |
| 5,053,669 | 10/1991 | Seki et al. .............................. | 310/316 |
| 5,081,405 | 1/1992 | Nelson .................................... | 318/448 |
| 5,099,180 | 3/1992 | Noguchi ................................ | 318/116 |
| 5,136,215 | 8/1992 | Izukawa ................................ | 310/316 |
| 5,146,143 | 9/1992 | Furutsu .................................. | 318/116 |
| 5,157,300 | 10/1992 | Kataoka et al. ........................ | 310/323 |
| 5,159,253 | 10/1992 | Shimizu et al. ........................ | 310/316 |
| 5,165,047 | 11/1992 | Shimizu et al. ........................ | 310/316 |
| 5,173,630 | 12/1992 | Tanaka .................................... | 310/316 |
| 5,285,134 | 2/1994 | Kataoka .................................. | 318/116 |
| 5,436,521 | 7/1995 | Kataoka .................................. | 310/317 |
| 5,459,370 | 10/1995 | Kataoka .................................. | 310/316 |
| 5,484,216 | 1/1996 | Kimura et al. .......................... | 400/319 |
| 5,539,268 | 7/1996 | Kataoka .................................. | 310/316 |
| 5,631,516 | 5/1997 | Kataoka .................................. | 310/316 |
| 5,764,018 | 6/1998 | Liepe et al. ............................ | 318/685 |

FOREIGN PATENT DOCUMENTS

| | | |
|---|---|---|
| 63-18974 | 1/1988 | Japan . |
| 63-167681 | 7/1988 | Japan . |
| 63-209478 | 8/1988 | Japan . |

Primary Examiner—Brian Sircus
Attorney, Agent, or Firm—Fitzpatrick, Cella, Harper & Scinto

[57] ABSTRACT

A position control device for driving a movable member by a motor to a target position prevents a re-start of the motor by the vibration after stopping of the movable member. A re-start operation is forcedly inhibited during a predetermined period after a stopping operation of the movable member at the target position, and is permitted, only after the predetermined period, is entered by the position of the movable member is different from the target position.

9 Claims, 12 Drawing Sheets

POSITION CONTROL DEVICE

BACKGROUND OF THE INVENTION

1. Field of the Invention

The present invention relates to a position control device, adapted for use in a motor, particularly a vibration wave motor, employed as an actuator in robots for factory automation and in measuring instruments.

2. Related Background Art

Among the motors of various types there is known, in addition to the electromagnetic motors widely used, a vibration type motor utilizing the relative movement between a vibration member in which a vibration is generated by an electromechanical converting element and a contact member maintained in contact with the vibration member. Such vibration type motor is being employed as a position controlling actuator for a moving member in robots and in various measuring instruments, because of various reasons such as the excellent stability of rotation at a low speed.

There are already proposed position control devices utilizing such vibration type motor, such as the one which is proposed in the Japanese Patent Laid-open Application No. 63-18974 and in which the power supply to the motor is automatically turned off when the actual position (detected by a position sensor) of the movable member reaches a target position, or the one which is proposed in the Japanese Patent Laid-open Application No. 63-167681 and in which the power supply to the motor is turned off when the actual position reaches a position slightly in front of the target position, in anticipation of an over-run, thereby stopping the movable member at the target position, or the one which is proposed in the Japanese Patent Laid-open Application No. 63-209478 and in which an inverse voltage is applied to the motor to rapidly stop the motor and the movable member when the actual position reaches the target position or the vicinity thereof.

In such devices, when the actual position of the movable member does not reach the target or overruns the target position when the motor is stopped, the motor is repeatedly re-activated until the actual position of the movable member coincides with the target position or the control is terminated without such corrective actions.

However, in the configuration in which the power supply to the motor is turned off when the actual position of the movable member coincides with the target position or a position in front thereof, the motor control setting has to be executable exactly when the actual position coincides with the target or front position, regardless of the function timing of the control device, since otherwise the actual position may overrun the target or front position between the function timings so that the stopping control may become meaningless.

Also in the configuration of rapidly stopping the movable member, it causes vibration by the impact generated by the rapid deceleration of the movable member whereby the detected position of the movable member vibrates around the actual stopping position. As a result, the movable member is judged as out of the target position and the motor is re-started. Consequently there may be required a long time before the motor is completely stopped or caused to generate a reciprocating motion.

Also when an external vibration is applied to the stopped movable member, even if there is scarce relative movement between the vibration member and the contact member of the vibration type motor, the detected position of the movable member vibration and may be judged as out of the target position, whereby the motor may be re-started.

Furthermore, if the overrun of the movable member is significant, reciprocating motions may continue without stopping at the target position.

In another position controlling method, the actual position of the movable member is not immediately brought to the final target position, but there are selected intermediate target positions successively approaching the final target position and the control is so conducted as to make the actual position of the movable member to coincide with such intermediate target positions in succession. In such control method, however, the movement of the movable member to the final target position is not smooth, i.e., if the motor is stopped upon reaching each intermediate target position.

Furthermore, if the drive means is driven with a high speed, the arrival of the actual position at the target position may be overlooked.

SUMMARY OF THE INVENTION

In consideration of the foregoing, one aspect of the present invention is to provide a position control device provided with a movable member driven by a motor, and detection means for detecting the position of the movable member, and adapted to effect position control for the motor by driving and stopping control therefor, based on the result of comparison of a target position and the position obtained from the detection means, the position control device comprising a stopping circuit for stopping the drive for the motor when the positional relationship between the target position and the position obtained from the detection means reaches a first positional relationship, a starting circuit for starting the drive for the motor when the positional relationship between the target position and the position obtained from the detection means reaches a second positional relationship different from the first positional relationship, and an inhibition circuit for inhibiting the function of the starting circuit for a predetermined period after the drive for the motor is stopped by the stopping circuit, regardless of the result of the comparison, whereby influence of the vibration at the time of stopping of the motor is prevented.

Another aspect of the present invention is to provide a position control device provided with a movable member driven by a motor, and detection means for detecting the position of the movable member, and adapted to effect position control for the motor by driving and stopping control therefore, based on the result of comparison of a target position and the position obtained from the detection means, the position control device comprising a stopping circuit for stopping the drive for the motor when the positional relationship between the target position and the position obtained from the detection means reaches a first positional relationship, a starting circuit for starting the drive for the motor when the positional relationship between the target position and the position obtained from the detection means reaches a second positional relationship different from the first positional relationship, and an inhibition circuit for inhibiting the function of the starting circuit after plural alternate cycles of the stopping of the motor by the stopping circuit and the start of the motor by the starting circuit, whereby influence of the vibration is prevented.

Another aspect of the present invention is to provide a position control device provided with a motor, a movable member connected with the motor, an encoder provided in the movable member, a comparator for comparing the output of the encoder with a set value, and a motor drive circuit including a switching element connected to the comparator and adapted to effect power supply to the motor, the position control device comprising a timer circuit connected to the comparator and a gate connected to the timer circuit and adapted, in response to the output of the timer circuit, to inhibit the response of the motor drive circuit in response to the output of the comparator, whereby influence of the vibration is prevented.

Another aspect of the present invention is to provide a position control device provided with a movable member driven by a motor, and detection means for detecting the position of the movable member, and adapted to effect position control for the motor by driving and stopping control therefor, based on the result of comparison of a target position and the position obtained from the detection means, the position control device comprising a comparator for inverting the output thereof from a first state signal to a second state signal in case the position obtained from the detection means exceeds the target position, a stop signal generation circuit for detecting the output of the comparator at a predetermined interval and generating a stop signal when the result of current detection and that of the immediately proceeding detection are of different state signals, and a motor drive circuit for stopping the drive for the motor by the stop signal, thereby effecting secure stop control by a simple configuration.

Still other objects of the present invention, and the features thereof, will become fully apparent from the following description which is to be taken in conjunction with the attached drawings.

DESCRIPTION OF THE PREFERRED EMBODIMENTS

[First embodiment]

Figure 2:
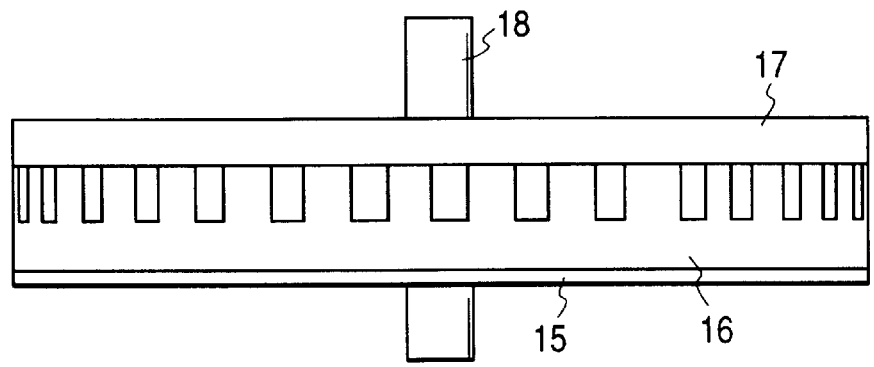
FIGS. 2 and 3 are views showing the configuration of a vibration type motor.
Figure 3:
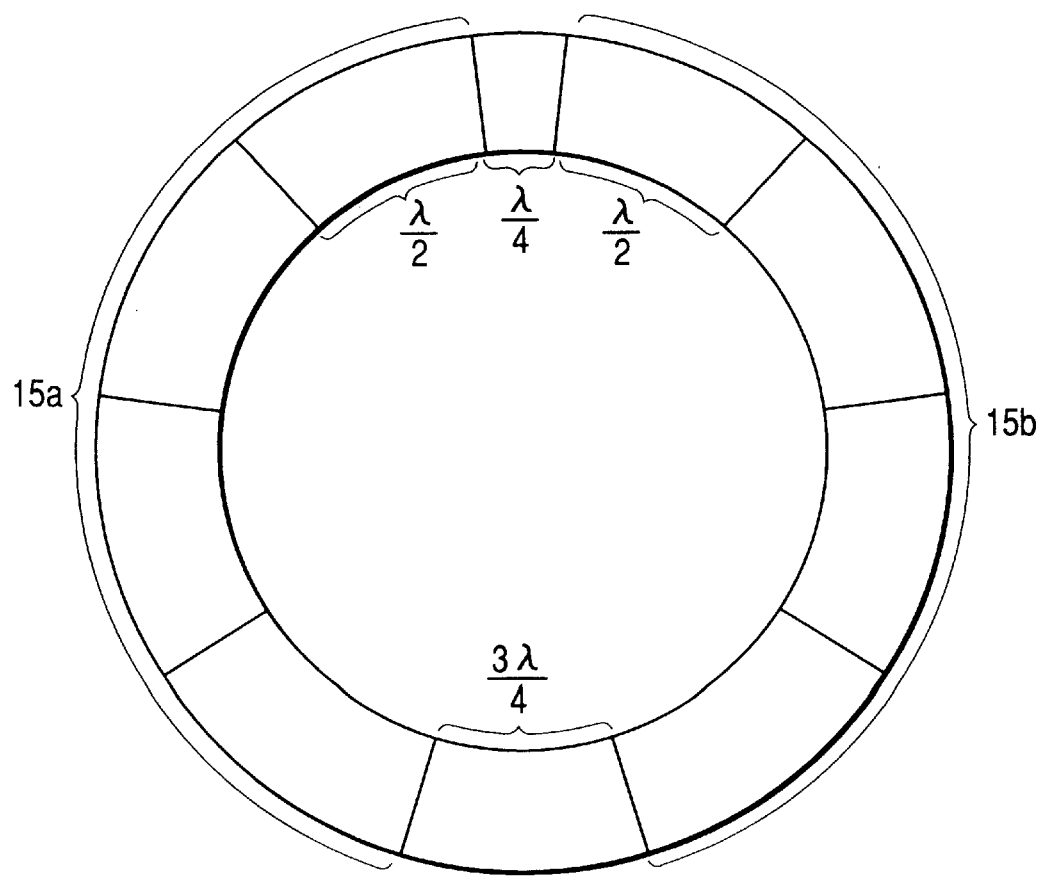

FIGS. 2 and 3 illustrate a vibration type motor to be used in the position control device constituting a first embodiment of the present invention. A piezoelectric member (electromechanical energy converting element) 15 receives, at electrodes 15a and 15b, 2-phase output voltages with a mutual phase difference of 90° from alternating voltage generation means 11 to be explained later. A circular elastic member (vibration member) 16 is fixed, at a face thereof, to the piezoelectric member 15 and is provided with projections on the other face.

A rotor 17 is maintained in pressure contact with the projections of the elastic member 16 by unrepresented pressurizing means and rotates along the external periphery of the elastic member 16 by the vibration thereof. An output shaft 18 transmits the rotation of the rotor 17.

In more details, the piezoelectric member 15 is divided into plural electrodes as shown in FIG. 3, illustrating an example in which the polarizing direction of the elastic member is alternately inverted at every ½ of the wavelength so as to form five waves along the circular periphery of the piezoelectric member 15. Electrode sections 15a, 15b are positionally displaced by ¼ of the wavelength. Upon receiving 2-phase output voltages which are mutually displaced by 90° in time from the AC voltage generation means 11 as explained above, standing waves with fifth-order natural modes are respectively generated in positions corresponding to the electrode sections 15a, 15b, and these standing waves are synthesized to generate a traveling wave which proceeds along the circular periphery of the piezoelectric member 15. The vibration is amplified by the projections of the elastic member 16, and the rotor 17 maintained in pressure contact rotates along the external periphery of the elastic member 16.

Figure 1:
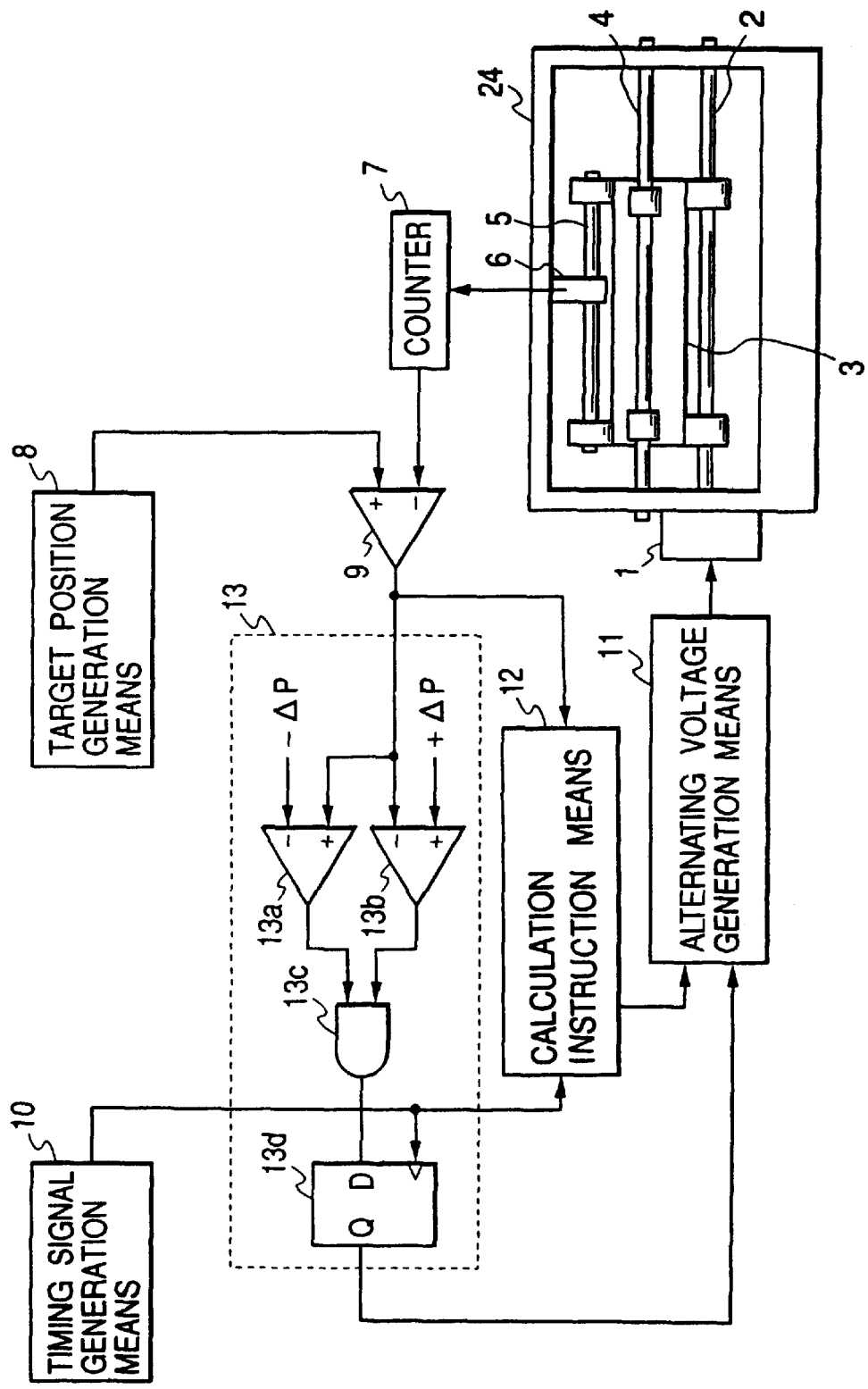
FIG. 1 is a block diagram of a position control device constituting a first embodiment of the present invention.

FIG. 1 shows a position control device constituting the first embodiment of the present invention, adapted for use as a control device for a movable member of a robot or a measuring instrument.

In FIG. 1 there are shown a vibration type motor 1 mentioned above; a feed screw 2 rotating integrally with the rotary shaft of the vibration type motor 1; a stage 3 constituting a movable member to be moved by the rotation of the feed screw 2; a guide member 4 for guiding the movement of the stage 3; an outer frame 24 for supporting the foregoing members; a linear scale 5 for detecting the position of the stage 3; a sensor 6 for reading gradations provided on the linear scale 5; and a counter 7 for converting the counted outputs of the sensor 6 into positional information.

There are further provided target position generation means 8 instructing a stop position for the stage 3 and adapted to generate such target position in response to an instruction from an unrepresented host computer; comparison calculation means 9 for calculating the difference between the target position outputted from the target position generation means 8 and the actual position of the stage 3, obtained from the counter 7; timing signal generation means 10 for generating timing signals for the calculations and stopping operation to be explained below; and alternating (AC) voltage generation means 11 for supplying the vibration type motor with plural AC voltages of instruction controlled frequency, phases and voltage values.

Calculation instruction means 12 controls the rotating direction of the vibration type motor 1 and the output voltage amplitude to the AC voltage generation means 11, in synchronization with timing signals of a predetermined interval, for example pulse signals of 2 kHz, to be outputted from the timing signal generation means 10, according to the output of the comparison calculation means 9.

Stop control means 13 instructs the AC voltage generation means 11 to execute a stop in a predetermined positional range (permissible stop position range) in synchronization with the timing signal outputted by the timing signal generation means 10. This stop instruction is only given when the output of the comparison calculation means 9 is within a range from $-\Delta P$ (an output corresponding to the difference between the target position and a permissible stop position defined at a side of the target position) to $+\Delta P$ (an output corresponding to the difference between the target position and a permissible stop position defined at the other side of the target position).

More specifically, when the output of the comparison calculation means 9 reaches a range from $-\Delta P$ to $+\Delta P$, comparators 13a, 13b release Hi-level outputs whereby an AND gate 13c releases a Hi-level output. Then, in synchronization with the timing signal outputted from the timing signal generation means 10, a D-flip-flop 13d detects the Hi-level output of the AND gate 13c and generates a Hi-level output as a stop instruction to the AC voltage generation means 11. In response the AC voltage generation means 11 reduces the amplitude of the AC voltage, thereby terminating the rotation of the vibration type motor 1 and stopping the stage 3 in the vicinity of the target position.

In the position control device of the above-explained configuration, since the stop control for the motor is executed as long as the stage 3 is within the range from $-\Delta P$ to $+\Delta P$ around the target position at the leading edge of the timing pulse signal outputted from the timing signal generation means 10, it is rendered possible to securely and rapidly stop the stage 3 in the vicinity of the target position, without repetition of the stopping and re-starting operation as in the prior art, by setting $\Delta P$ at an appropriate value (a value corresponding to a distance longer than the moving distance of the stage 3 within the interval of the timing pulses: for example 10 $\mu$m) even if the interval of the timing pulse signals is not short or if the interval of the gradations of the linear scale 5 is small.

[Second embodiment]

Figure 4:
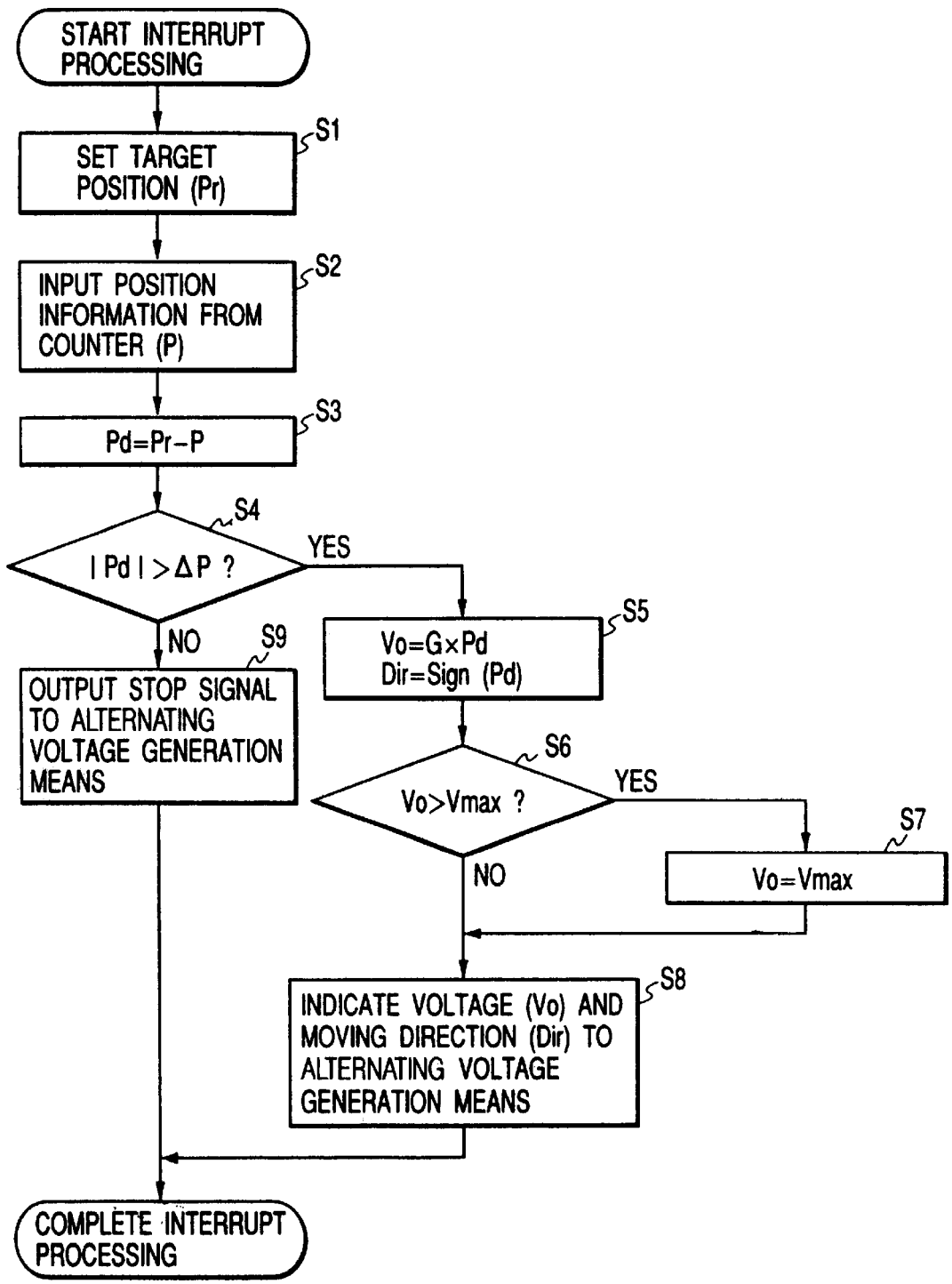
FIG. 4 is a flow chart showing the control sequence of a position control device constituting a second embodiment of the present invention.

In the following there will be explained, with reference to a flow chart shown in FIG. 4, a second embodiment in which the function of the position control device of the first embodiment is realized by software. This control sequence is executed by an unrepresented microcomputer at a predetermined interval (for example 1 msec.) and such execution is equivalent to the function of the calculation instruction means 12 and the stop control means 13 in synchronization with the timing signals outputted from the timing signal generation means 10 in the first embodiment.

At first, when an interruption signal (outputted at every predetermined interval) is entered in a state where the target position is already set, the sequence proceeds from a step S1 to S4 for comparing the actual position of the stage 3, detected by the counter 7 and represented by a single detection value or by an average of plural detection values. If the absolute value of the difference between the target position and the actual position of the stage 3 is larger than $\Delta P$, the sequence proceeds from a step S5 to S8 for instructing the moving direction to the AC voltage generation means 11 according to the sign of the difference and also instructing the AC voltage generation means 11 to output a voltage equal to the difference multiplied by a gain G. However, the voltage outputted from the AC voltage generation means 11 is limited so as not to exceed a predetermined voltage. On the other hand, if the absolute value of the difference between the target value and the actual position of the stage 3 is not larger than $\Delta P$, the sequence proceeds to a step S9 to send a stop signal to the AC voltage generation means 11.

In the present embodiment, as the stop control for the motor is executed as long as the stage 3 is within the range from $-\Delta P$ to $+\Delta P$ around the target position even when the stage 3 moves so fast that it moves by an amount corresponding to several pulses within a single interruption interval and it may therefore overshoot the target position within an interval from the preceding interruption cycle to the next interruption cycle, it is still rendered possible to securely and rapidly stop the stage 3 in the vicinity of the target position by setting $\Delta P$ at an appropriate value (for example 10 $\mu$m) even if the interval of the interruptions is long because of a long processing time of the position control program or if the interval of the gradations of the linear scale 5 is small.

[Third embodiment]

Figure 5:
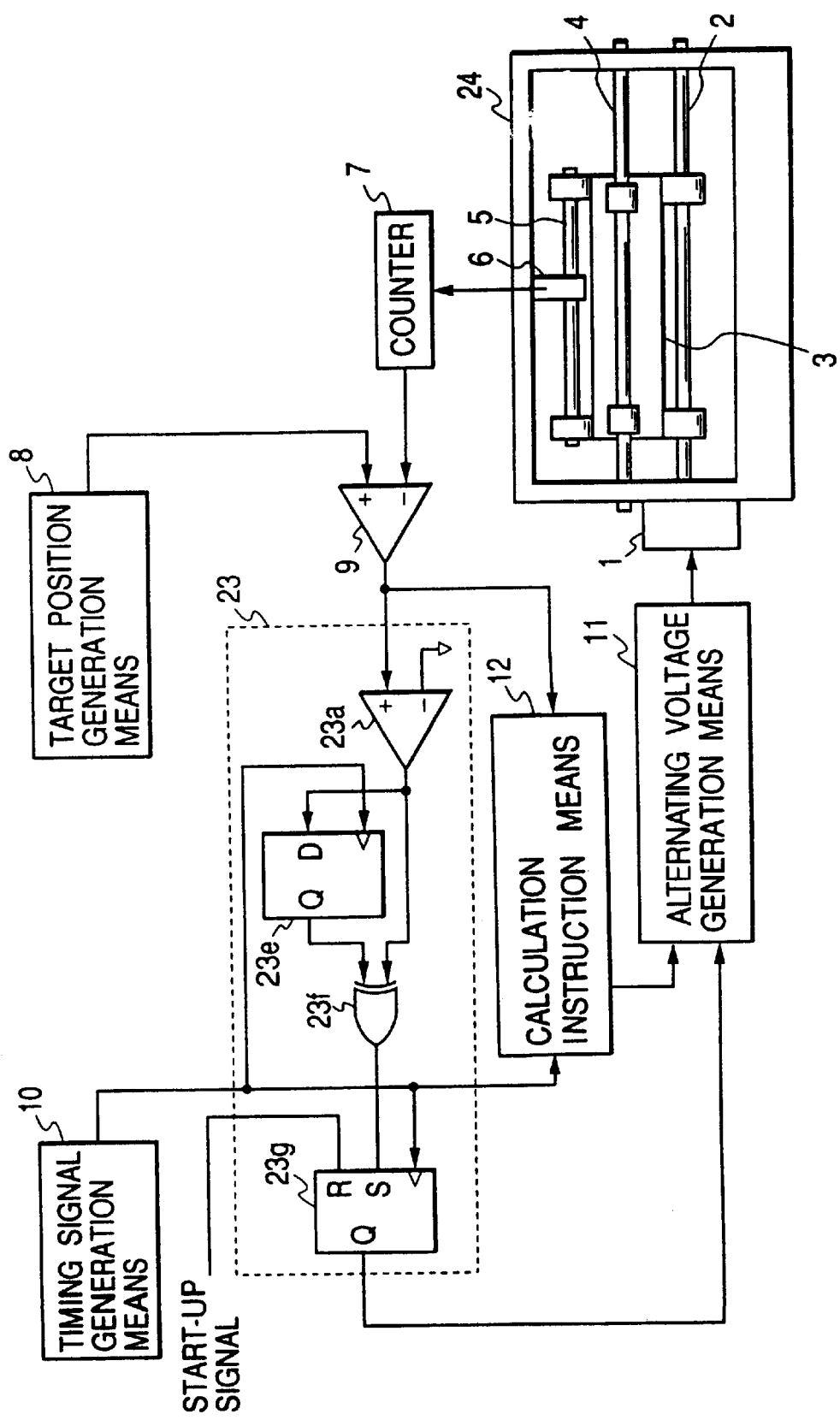
FIG. 5 is a view showing the configuration of a position control device constituting a third embodiment of the present invention.

FIG. 5 illustrates the configuration of a position control device constituting a third embodiment of the present invention, wherein stop control means 23 is different in configuration from the stop control means 13 of the first embodiment.

There are provided a comparator 23a for comparing the output of the comparison calculation means 9 with zero; a D-flip-flop 23e for latching the output of the comparator 23a at the leading edge of the timing signal from the timing signal generation means 10; an exclusive OR gate 23f for obtaining the exclusive OR operation of the output of the D-flip-flop 23e and that of the comparator 23a; and an RS-flip-flop 23g for outputting, at the leading edge of the timing signal, a Hi-level signal if the S input is at the Hi-level thereby stopping the AC voltage generation means 11 or canceling such stop operation if the R input is at the Hi-level.

The stop instruction is given to the AC voltage generation means 11 at the leading edge of the timing signal by the Hi-level output of the exclusive OR gate 23f, when the outputs of the D-flip-flop 23e and of the comparator 23a are mutually different.

Since the output of the comparator 23a assumes Hi-level or Lo-level respectively when the output of the comparison calculation means 9 is positive or negative, the stop instruction is given to the AC voltage generation means 11 when the output of the comparison calculation means 9 changes in sign. Consequently the target position is not overlooked even if the moving speed of the stage 3 is fast, and the stage 3 can be securely stopped after reaching the target position.

Also, the stopped stage 3 can be re-started by maintaining a start signal from an unrepresented instruction means at the Hi-level state at least for a cycle time of the timing signals generated by the timing signal generation means 10 and thereafter returning the start signal to the Lo-level state.

[Fourth embodiment]

Figure 6:
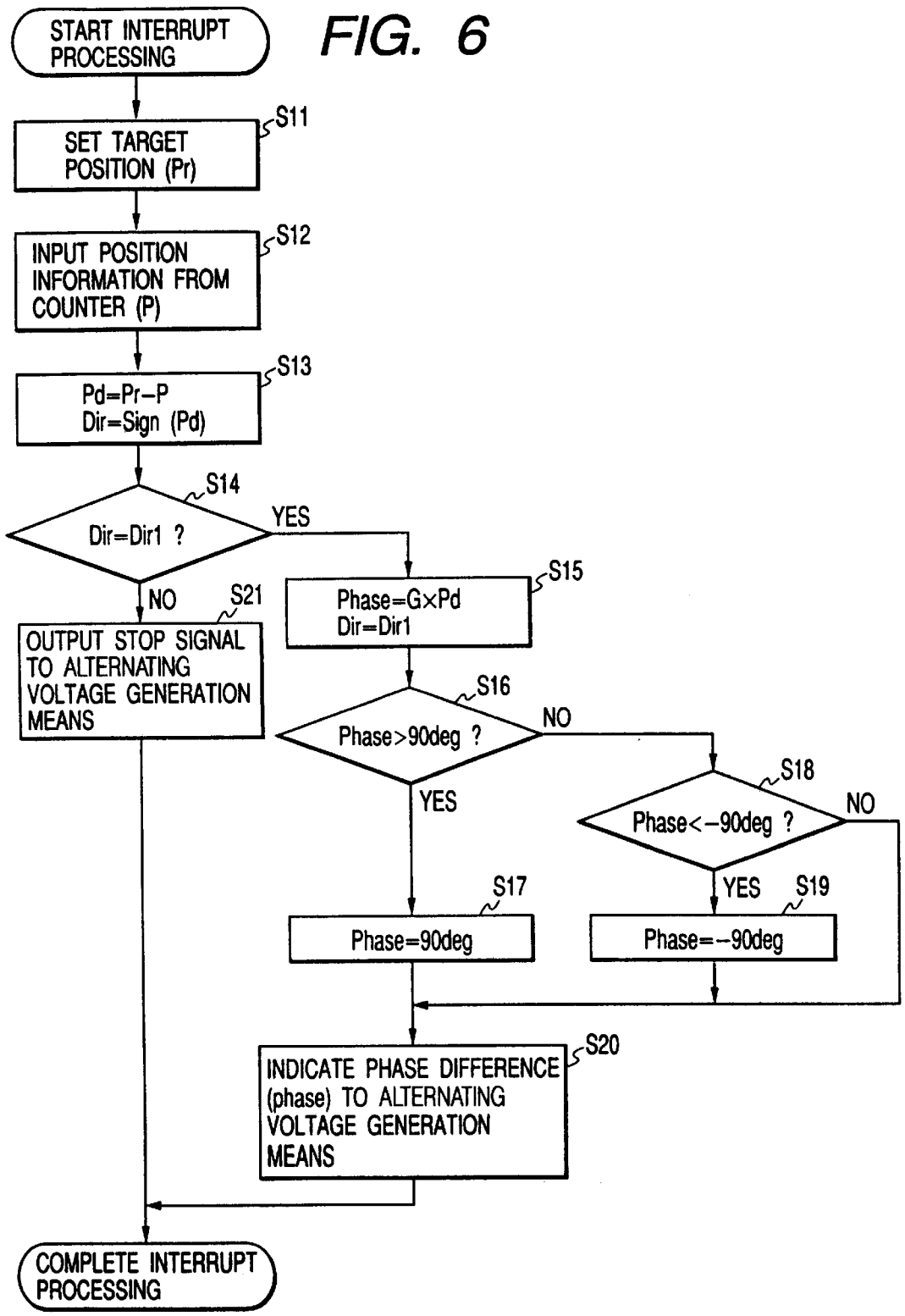
FIG. 6 is a flow chart showing the control sequence of a position control device constituting a fourth embodiment of the present invention.

In the following there will be explained, with reference to a flow chart shown in FIG. 6, a fourth embodiment in which the function of the position control device of the third embodiment is realized by software. This control sequence is executed by an unrepresented microcomputer at a predetermined interval (for example 1 msec) and such execution is equivalent to the function of the calculation instruction means 12 and the stop control means 23 in synchronization with the timing signals outputted from the timing signal generation means 10 in the third embodiment.

At first, when the interrupt process is activated by an interrupt signal from the timing signal generation means 10, the sequence proceeds from a step S11 to S13 for calculating the difference between the target position and the actual position of the stage 3, detected by the counter 7, and a step S14 compares the sign of the result of the calculation with the sign calculated and memorized in the preceding interrupt process.

If these signs are the same, the sequence proceeds from a step S15 to S20 for memorizing the current sign in a register, then multiplying the difference between the target position and the actual position of the stage 3 by a gain G, and indicating the phase difference of the 2-phase AC voltages to the AC voltage generation means 11. However the absolute value of the phase difference has an upper limit of 90° and is limited to 90° if it exceeds the upper limit.

On the other hand, if the signs are different, the stop operation instruction is sent to the AC voltage generation means 11.

As the vibration type motor determines its rotating direction according to the direction of the phase difference between the applied voltage, stops at a phase difference of 0° and rotates at the highest speed at a phase difference of 90°, the present embodiment allows the stage 3 to approach the target position with a speed which becomes higher or lower as the difference between the target position and the actual position becomes larger or smaller, and to smoothly stop in the vicinity of the target position.

[Fifth embodiment]

Figure 7:
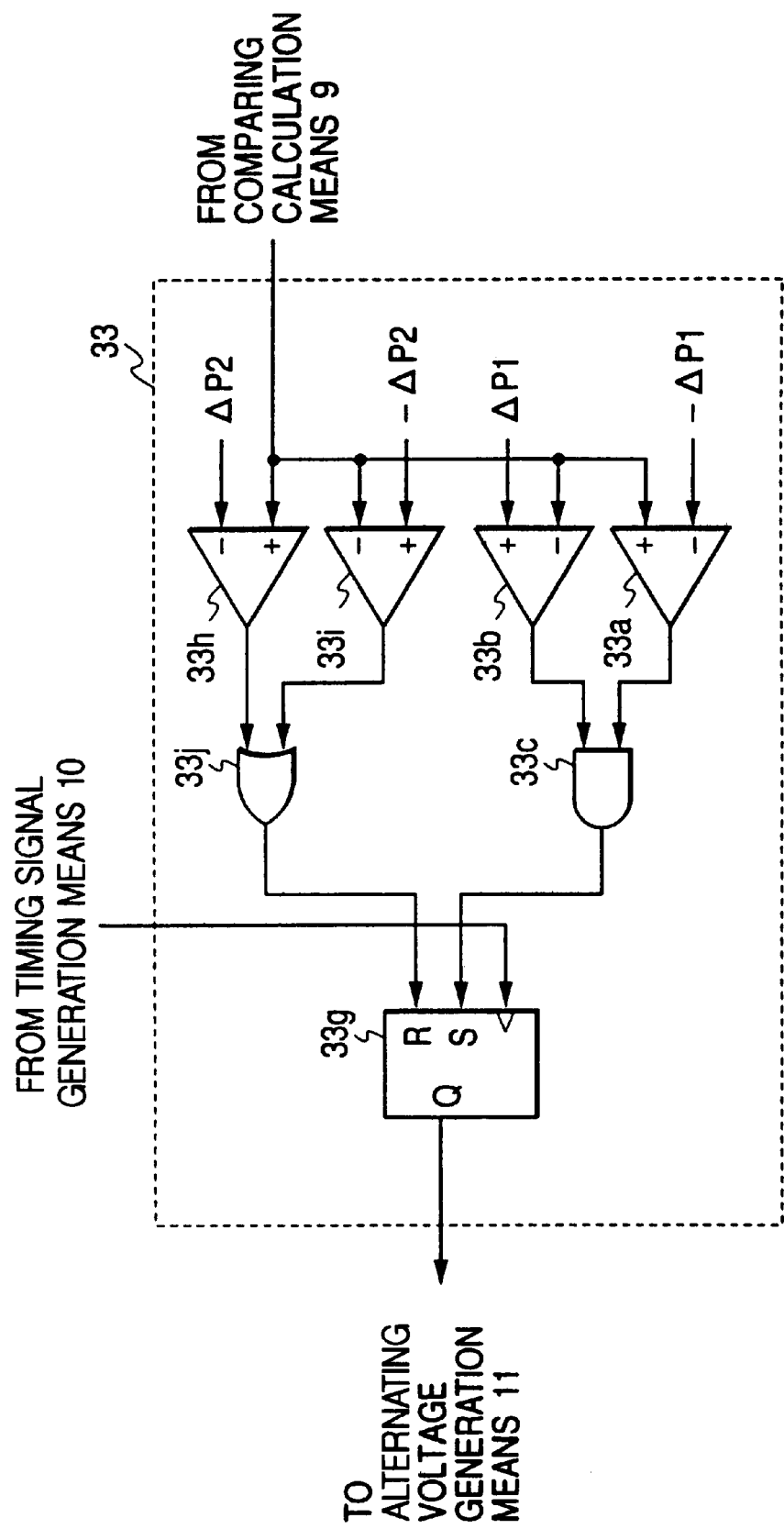
FIG. 7 is a view showing the configuration of a position control device constituting a fifth embodiment of the present invention.

FIG. 7 shows stop control means 33 of a position control device constituting a fifth embodiment of the present invention. In the present embodiment, components other than the stop control means 33 are the same as those in the position control device of the first embodiment.

There are provided comparators 33a, 33b, 33h, 33i; an AND gate 33c; an OR gate 33j; and an RS-flip-flop 33g.

The comparators 33a, 33b and the AND gate 33c are constructed so as to release a Hi-level output from the AND gate 33c only when the input from the comparison calculation means 9 is within a range from $-\Delta P1$ to $+\Delta P1$, thereby shifting the S-input of the RS-flip-flop 33g to the Hi-level state and instructing a stop operation to the AC voltage generation means 11. It is thus rendered possible to realize a secure stopping operation by suitably selecting $\Delta P1$ as in the first embodiment, even if the stage 3 has a fast moving speed.

On the other hand, the comparators 33h, 33i and the OR gate 33j are constructed so that the OR gate 33j releases a Hi-level output when the input from the comparison calculation means 9 goes out of a range from $-\Delta P2$ to $+\Delta P2$, thereby shifting the R-input of the RS-flip-flop 33g to the Hi-level state and instructing the cancellation of the stop operation to the AC voltage generation means 11. In the first embodiment, when the stage 3 is stopped in the vicinity of the boundary of the range from $-\Delta P1$ to $+\Delta P1$, the position of the stage 3 may be regarded as having exceeded the boundary position even by a slight vibration and the motor may be re-started. The present embodiment can avoid such situation by suitably selecting $-\Delta P2$ and $\Delta P2$ so as to satisfy relations $-\Delta P2 < -\Delta P1$ and $\Delta P1 < \Delta P2$, thereby improving the stability at the stopped state.

[Sixth embodiment]

Figure 8:
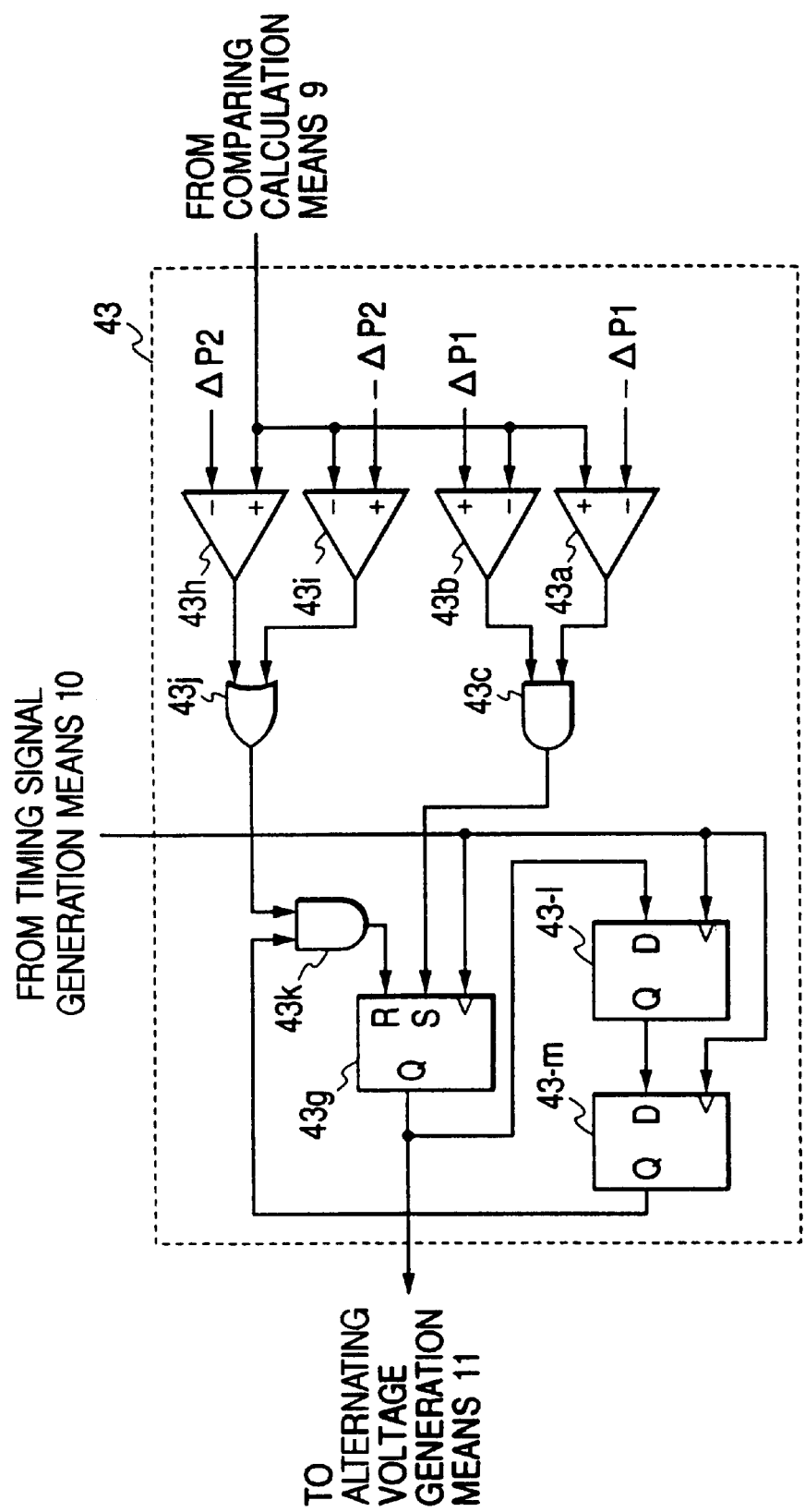
FIG. 8 is a view showing the configuration of a position control device constituting a sixth embodiment of the present invention.

FIG. 8 shows stop control means 43 of a position control device constituting a sixth embodiment of the present invention. In the present embodiment, components other than the stop control means 43 are the same as those in the position control device of the first embodiment.

The present embodiment is constructed basically same as the fifth embodiment, so that a stop operation is instructed to the AC voltage generation means 11 when the input from the comparison calculation means 9 is within a range from $-\Delta P1$ to $+\Delta P1$ and a cancellation of the stop operation is instructed when the input from the comparison calculation means 9 goes out of a range from $-\Delta P2$ to $+\Delta P2$.

However the period from the instruction for the stop operation to the instruction for the cancellation of the stop operation is selected to be at least longer than a cycle time of the timing signals from the timing signal generation means 10.

More specifically, D-flip-flops 43l, 43m constitute a shift register for delaying a stop signal to the AC voltage generation means 11 by 2 cycle times of the timing signals, and an AND gate 43k releases a logic product of the stop signal, delayed by 2 cycle times, and a re-start signal from the OR gate 43j, as the R-input signal to the RS-flip-flop 43g, whereby the motor cannot be re-started at least during 2 clock periods after the stage 3 is stopped.

The re-start inhibition time can be arbitrarily set by varying the number of D-flip-flops constituting the above-mentioned shift register or by selecting the delay time by a separate timer. Such timer can assume any known configuration instead of the above-explained configuration, such as a counter or a software timer in the microcomputer.

In the present embodiment, even if a large mechanical vibration is generated at the time of a stopping operation of the stage 3, it is possible to determine whether or not to re-start the motor 1 after such vibration is quenched to a certain extent. It is therefore possible to select relatively small values, for example 10 and 40 $\mu$m for $\Delta P1$ and $\Delta P2$, thereby improving the positional precision and the positional resolving power.

[Seventh embodiment]

Figure 9:
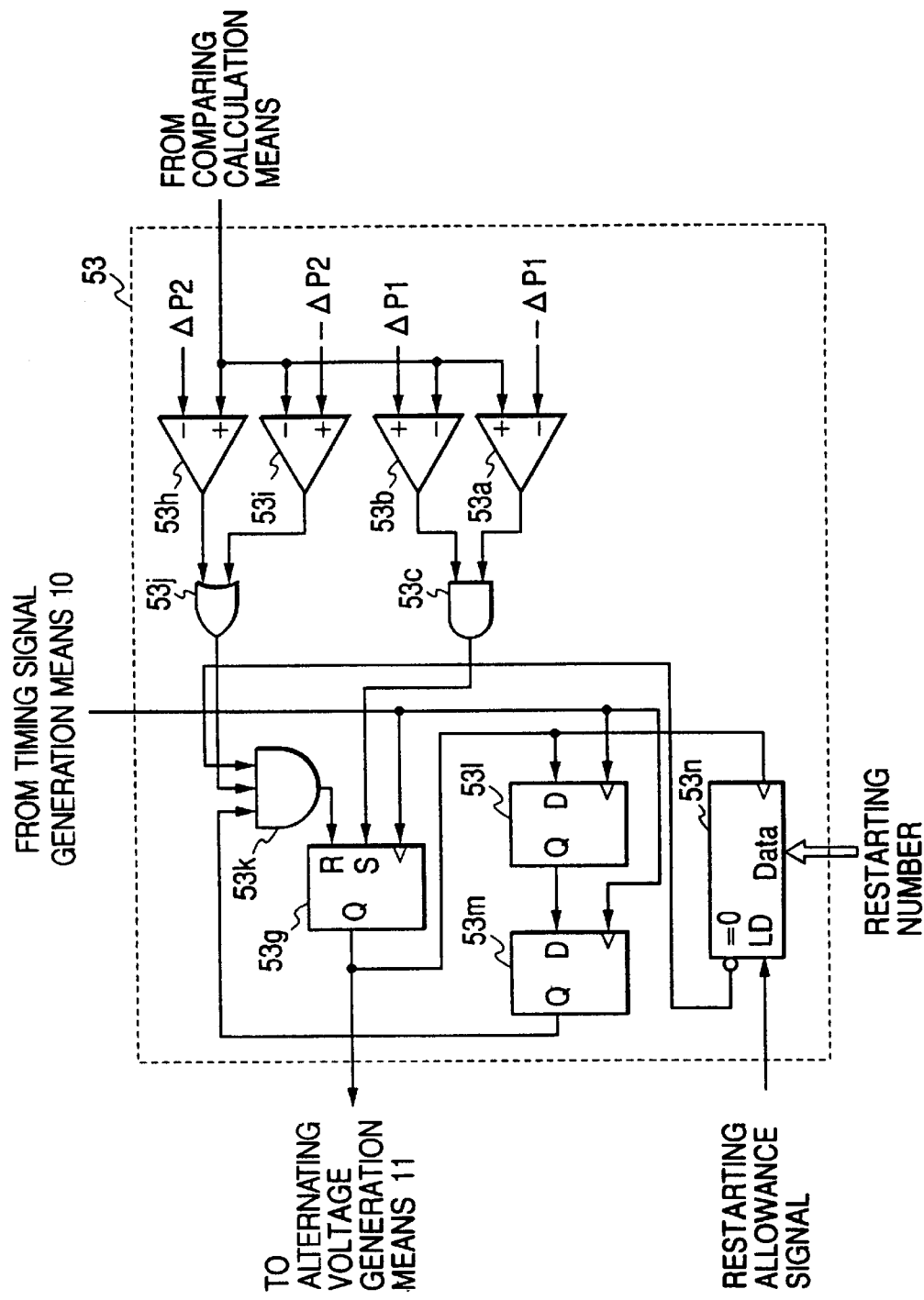
FIG. 9 is a view showing the configuration of a position control device constituting a seventh embodiment of the present invention.

FIG. 9 shows stop control means 53 of a position control device constituting a seventh embodiment of the present invention. In the present embodiment, components other than the stop control means 53 are the same as those in the position control device of the first embodiment.

The present embodiment includes, in addition to the components of the sixth embodiment, a presentable down-counter 53n as means for securely stopping the stage 3 even when the stage 3 is poor in rigidity and in stability of control.

The down-counter 53n receives a re-start permission signal at the LD input thereof, and, when this signal is shifted to the Hi-level state, a predetermined upper limit number of re-starts is entered into the down-counter 53n through the Data input thereof, whereby the output=0 is shifted to the Hi-level state.

If the output of the comparison calculation means 9 is not within the range from $-\Delta P2$ to $\Delta P2$, the output of the RS-flip-flop 53g instructs the cancellation of the stop operation to the AC voltage generation means 11 at the leading edge of the timing signal from the timing signal generation means 10. Then, when the output of the comparison calculation means 9 enters the range from $-\Delta P1$ to $\Delta P1$, a stop operation instruction is sent to the AC voltage generation means 11.

In this situation the stop operation and the cancellation thereof are to be repeated if the difference from the target position falls out of the range from −ΔP2 to ΔP2, because of the insufficient attenuation of the vibration after stopping due to the poor rigidity of the stage 3, to again instruct the cancellation of the stop operation to the AC voltage generation means 11. In the present embodiment, however, the clock input of the down-counter 53n receives a leading edge pulse at each stop, whereby the number of re-starts is decreased by one at each input of such pulse. When the content of the down-counter 53n reaches zero, the output=0 is shifted to the Lo-level state, whereby the input to the AND gate 53k is shifted to the Lo-level state to inhibit the re-start until the re-start permission signal is thereafter shifted to the Hi-level state. Therefore, even if the position of the stage 3 goes out of the range from −ΔP2 to ΔP2 by a vibration after stopping, the motor 1 is not immediately re-started so that the stability in the stopped state can be secured.

The re-start permission signal may be generated in the case of a change in the position instruction generated by the target position generation means 8 shown in FIG. 1.

[Eighth embodiment]

Figure 10:
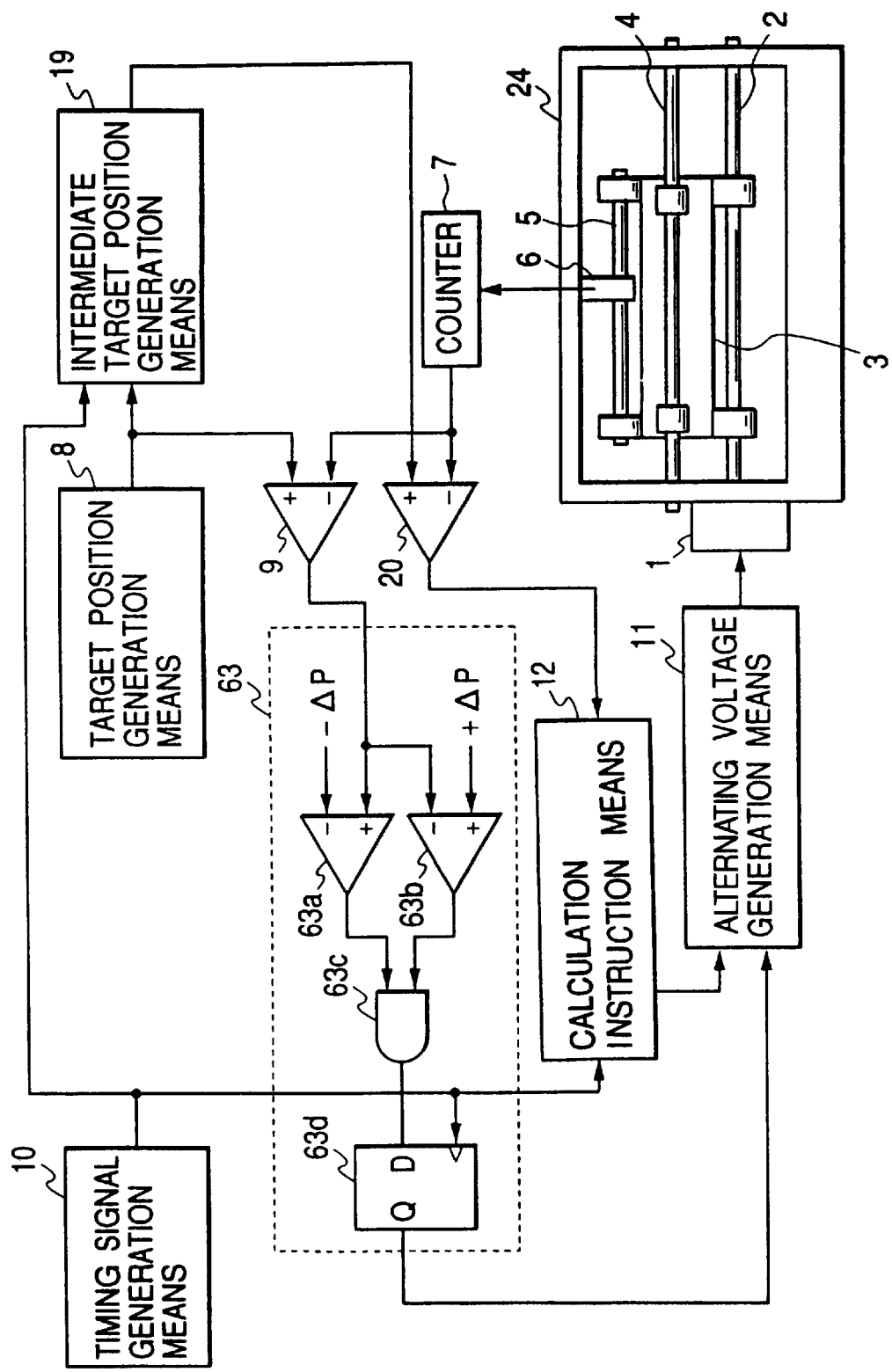
FIG. 10 is a view showing the configuration of a position control device constituting an eighth embodiment of the present invention.

FIG. 10 shows a position control device constituting an eighth embodiment of the present invention. In the position control device of the present embodiment, as in the device of the first embodiment, stop control means 63 instructs a stop operation to the AC voltage generation means 11 when the difference between target position, corresponding to a signal generated by the target position generation means 8, and the actual position of the stage 3 enters the range from −ΔP to ΔP, thereby stopping the stage 3. However the operation in the course of movement of the stage 3 is different from that in the first embodiment.

Intermediate target position generation means 19 generates, when a change in the target position instruction is entered by the target position generation means 8, an intermediate target position between the target position prior to the change and the final target position after the change, so as to gradually approach the final target position in synchronization with the timing signal outputted from the timing signal generation means 10.

Comparison calculation means 20 detects the difference between the actual position of the stage 3, outputted from the counter 7, and the output of the intermediate target position generation means 19. The output of the comparison calculation means 20 is supplied to calculation instruction means 12, which in response controls the output voltage of the AC voltage generation means 11 in such a manner that the actual position of the stage 3 coincides with the intermediate target position generated by the intermediate target position generation means 19.

The stage 3 moves toward the final target position with a higher or lower speed respectively if the intermediate target position is brought faster or slower closer to the final target position. Consequently the stage 3 can be moved to the final target position with various speed patterns, by changing the approaching speed of the intermediate target position to the final target position.

Moreover, as the stop instruction is not given to the motor 1 even when actual position of the stage 3 coincides with the intermediate target position, there will not be induced an unsmooth movement such as repetition of stopping and re-starting in the course of movement to the final target position and the stage 3 can be smoothly brought to the final target position.

Figure 11:
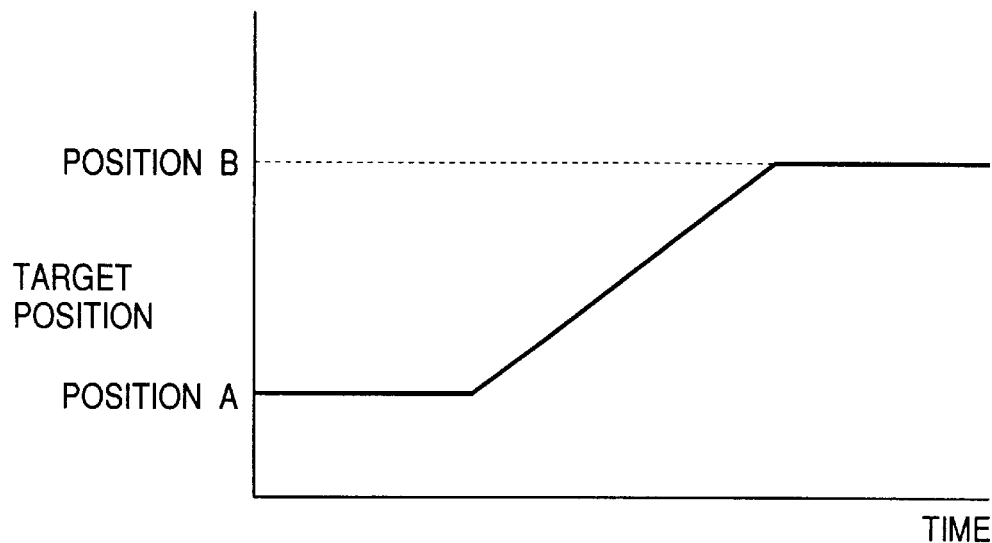
FIGS. 11 an 12 are charts showing the change in the intermediate target position in the position control device of the eighth embodiment.
Figure 12:
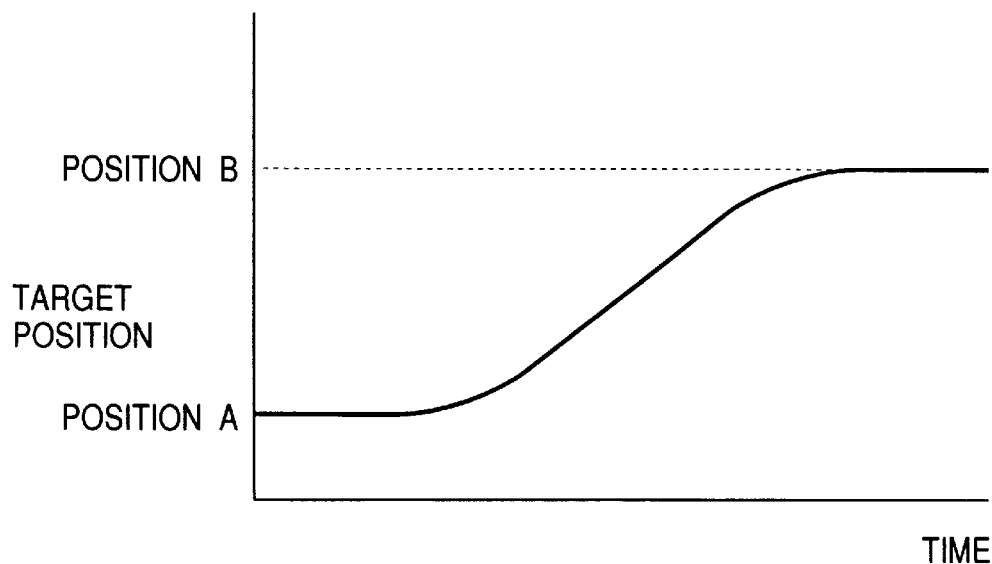

FIGS. 11 and 12 show examples of the output (intermediate target position) of the intermediate target position generation means 19 when the output (final target position) of the target position generation means 8 changes from a position A to B. FIG. 11 shows an example in which the intermediate target position (namely stage 3) is moved to the final target position at a constant speed, while FIG. 12 shows an example in which the intermediate target position is moved smoothly, with acceleration and deceleration, to the final target position.

In the present embodiment, the rotational velocity of the vibration type motor is varied by a change in the amplitude of the voltage outputted from the AC voltage generation means 11, but such variation in the rotational velocity may also be achieved by a change in the frequency of the AC voltage.

Figure 13:
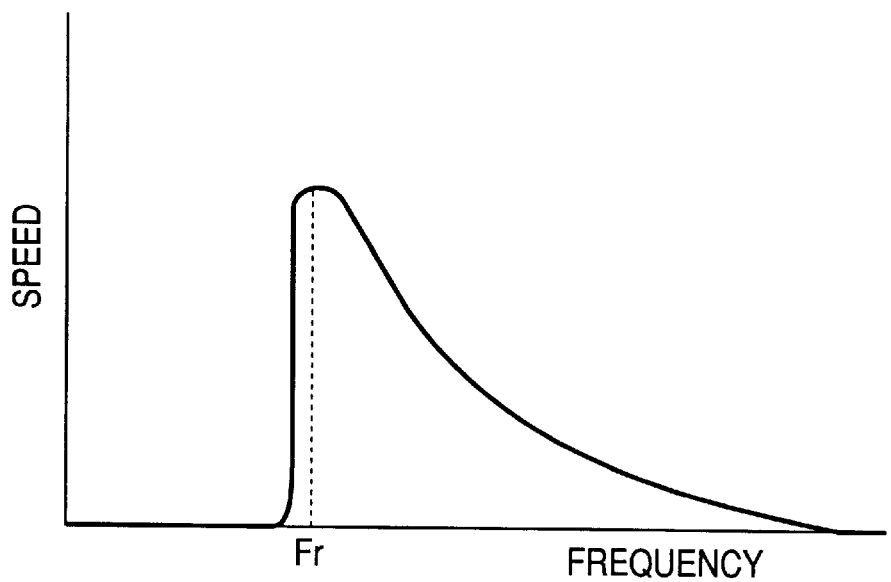
FIG. 13 is a chart showing the relationship between the frequency and the rotational velocity of a vibration type motor.

FIG. 13 shows the relationship between the frequency of the AC voltage and the rotational velocity. In a frequency range higher than the resonance frequency Fr of the vibration type motor 1, the rotational velocity thereof is higher as the frequency is closer to the resonance frequency Fr. Consequently the rotational velocity of the vibration type motor can be made faster by setting the frequency closer to the resonance frequency Fr of the vibration type motor in the frequency region higher than the resonance frequency Fr, instead of increasing the voltage amplitude, or slower by setting the frequency farther from the resonance frequency Fr in the frequency region higher than the resonance frequency Fr instead of decreasing the voltage amplitude.

Also similar effects can be obtained by applying the stop control means 23, 33, 43 or 53 of the foregoing third, fifth, sixth or seventh embodiment to the position control device of the present embodiment.

Figure 15:
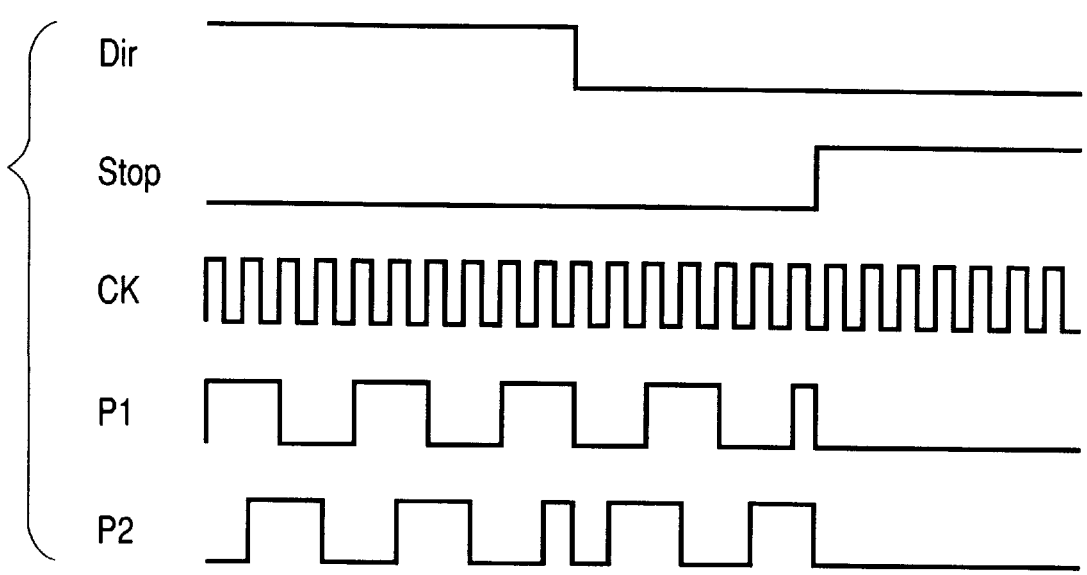
FIG. 15 is a timing chart showing signal waves in various parts of the above-mentioned alternative voltage generation means.
Figure 14:
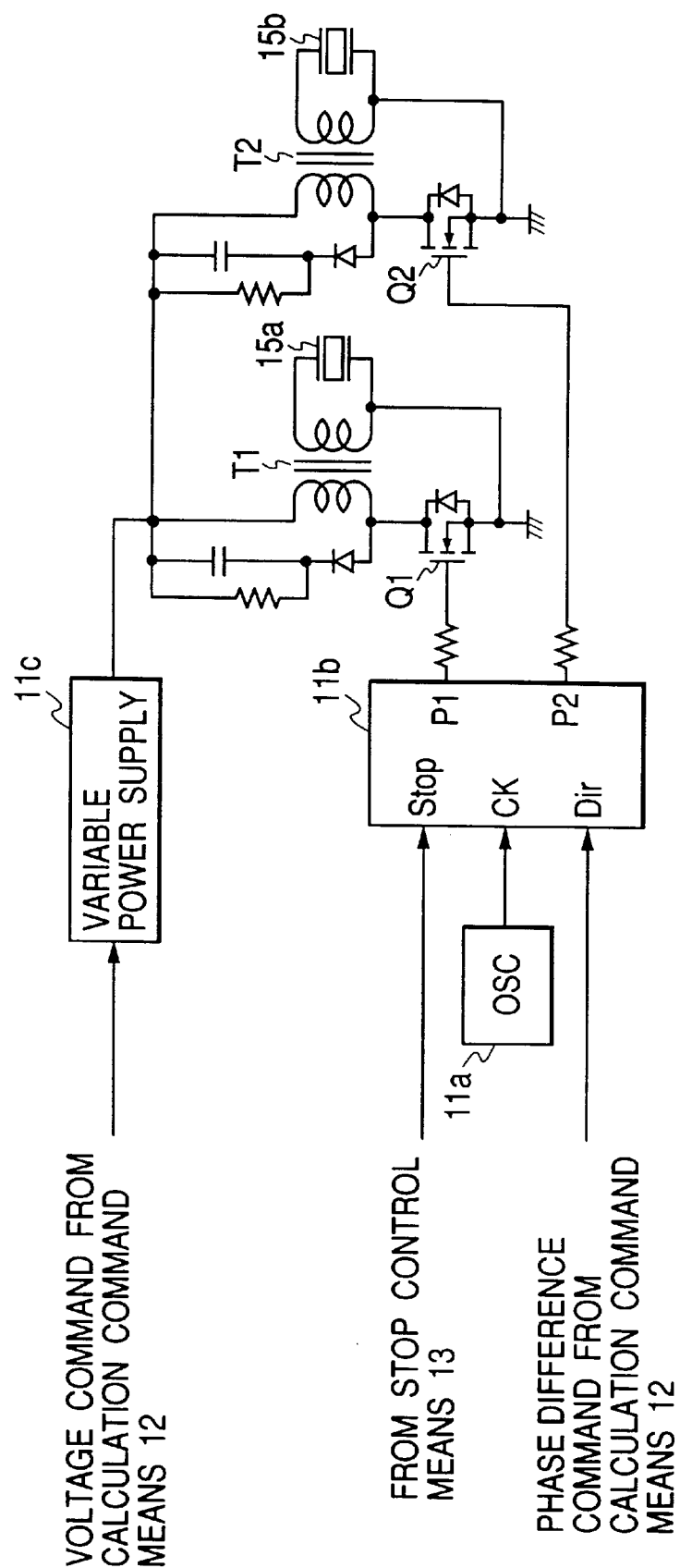
FIG. 14 is a circuit diagram of alternating voltage generation means employed in the position control device of the foregoing embodiment.

FIG. 14 shows an example of the configuration of the AC voltage generation means 11 in the first to eighth embodiments, and FIG. 15 shows the signal wave forms in various parts of the AC voltage generation means. There are provided an oscillator 11a for generating a predetermined frequency higher than the natural frequency of the vibration type motor 1; and a pulse generator 11b for driving a switching element to be explained later. The pulse generator 11b divides, as shown in FIG. 15, the frequency of an input clock signal CK from the oscillator 21 to generate pulse signals P1, P2 which are mutually displaced in phase by +90°, the phase difference being switched to 90° or −90° in response to a signal Dir or to Lo-level in response to a Stop signal.

A variable power supply 11c varies the output voltage according to a voltage instruction from the calculation instruction means 12. The pulse signals P1, P2 are supplied to gate terminals of MOSFET's Q1, Q2 which switch primary currents of transformers T1, T2 of which secondary sides are connected to the piezoelectric members 15a, 15b of the vibration type motor 1. The secondary sides generate voltages of about 100 V. These voltages vary according to the output voltage of the variable power supply 11c, and the vibration type motor 1 rotates faster as the voltage increases.

In the foregoing embodiments the position of the stage 3 is detected by a linear scale, but it is also possible, in the present invention, to directly mount a rotary encoder or the like for detecting the rotation angle of the feed screw 2 on the rotary shaft and to set ΔP at about 10 angular seconds.

Also the present invention can be likewise applied to a configuration where the stage 3 is fixed to an unrepresented fixed table and the outer frame 24 integrally moves with the vibration type motor 1. Also there may be employed any motor other than the vibration type motor.

What is claimed is:

1. A position control device for use with a motor, a movable member driven by the motor, and detection means for detecting a position of the movable member, said position control device effecting position control by starting and stopping a drive operation of the motor based on the result of a comparison of a target position and the position detected by the detection means, said position control device comprising:

- a stopping circuit for stopping a drive operation of the motor when the positional relationship between the target position and the position detected by the detection means reaches a first positional relationship;
- a starting circuit for starting a drive operation of the motor when the positional relationship between the target position and the position detected by the detection means reaches a second positional relationship different from said first positional relationship; and
- an inhibition circuit for inhibiting said starting circuit from restarting a drive operation for a predetermined period after a drive operation of the motor is stopped by said stopping circuit, regardless of the result of the comparison, the predetermined period being an elapsed time measured from a moment at which the positional relationship between the target position and the position detected by the detection means reaches the first positional relationship.

2. A position control device according to claim 1, wherein said stopping circuit stops a drive operation of the motor when the difference between the target position and the position detected by the detection means reaches a first range.

3. A position control device according to claim 2, wherein said starting circuit restarts a drive operation of the motor if the difference between the target position and the position detected by the detection means is outside the first range after the predetermined period.

4. A position control device according to claim 2, wherein said starting circuit restarts a drive operation of the motor if the difference between the target position and the position detected by the detection means is outside a second range wider than the first range after the predetermined period.

5. A position control device according to claim 1, wherein the motor is a vibration type motor.

6. A position control device for use with a motor, a movable member driven by the motor, and detection means for detecting a position of the movable member, said position control device effecting position control by starting and stopping a drive operation of the motor based on the result of a comparison of a target position and the position detected by the detection means, said position control device comprising:

- a stopping circuit for stopping a drive operation of the motor when a positional relationship between the target position and the position detected by the detection means reaches a first positional relationship;
- a starting circuit for starting a drive operation of the motor when the positional relationship between the target position and the position detected by the detection means reaches a second positional relationship different from the first positional relationship; and
- an inhibition circuit for inhibiting said starting circuit from restarting a drive operation of the motor after the stopping circuit stops a drive operation of the motor restarted by said starting circuit plural times.

7. A position control device according to claim 6, wherein the motor is a vibration type motor.

8. A position control device for use with a motor, a movable member connected to the motor, an encoder provided on the movable member, a comparator circuit which compares an output of the encoder with a set value and outputs (1) a stop signal when a relationship between the output of the encoder and the set value reaches a first relationship and (2) a start signal when the relationship between the output of the encoder and the set value reaches a second relationship different from the first relationship, and a motor drive circuit, which is connected to the comparator circuit and includes a switching element for providing power supply to the motor, and which causes the switching element (i) to start providing power supply in response to a start signal, and (ii) to stop providing power supply in response to a stop signal, said position control device comprising:

- a timer circuit, connected to the comparator circuit, for starting a time measurement operation for measuring a predetermined elapsed time in response to a stop signal; and
- an inhibition circuit, connected to said timer circuit and responsive to the output of said timer circuit, for inhibiting operation of said motor drive circuit in response to a start signal during a period in which the timer circuit measures the predetermined elapsed time.

9. A position control device according to claim 8, wherein the motor is a vibration type motor.

* * * * *

UNITED STATES PATENT AND TRADEMARK OFFICE
CERTIFICATE OF CORRECTION

PATENT NO. : 5,939,851

DATED : August 17, 1999

INVENTOR(S): KENICHI KATAOKA, ET AL.

It is certified that error appears in the above-identified patent and that said Letters Patent is hereby corrected as shown below:

COLUMN 10,
Line 43, "+90°," should read --90°,--, and "90°" should read --+90°--.

Signed and Sealed this

Twenty-first Day of March, 2000

Attest:

Q. TODD DICKINSON

Attesting Officer

Commissioner of Patents and Trademarks